United States Patent [19]

Weiss

[11] 3,928,807

[45] Dec. 23, 1975

[54] HOMODYNE FM RECEIVER WITH FOLDED SIGNAL AND GATED UNFOLDING SIGNAL DETECTION

[76] Inventor: Stephen F. Weiss, 2157 N. 64th, Seattle, Wash. 98103

[22] Filed: Nov. 17, 1969

[21] Appl. No.: 877,271

[52] U.S. Cl. .................................. 325/344; 325/444

[51] Int. Cl.[2] .............................................. H04B 1/30

[58] Field of Search ........... 325/344, 349, 351, 342, 325/444; 329/110, 123, 126, 122, 150, 153; 328/22, 26, 27, 32, 25, 30, 39; 179/1 R

[56] References Cited

UNITED STATES PATENTS

| | | | |
|---|---|---|---|
| 2,498,900 | 2/1950 | Schoenfeld | 328/26 |
| 2,509,066 | 5/1950 | Koch | 325/487 X |
| 2,978,642 | 4/1961 | Papineau | 328/32 |
| 3,163,821 | 12/1964 | Hopner et al. | 325/351 |
| 3,286,256 | 11/1966 | Covill | 325/444 X |
| 3,437,941 | 4/1969 | Leary | 325/349 |
| 3,510,776 | 5/1970 | Boenke | 325/349 |
| 3,538,246 | 11/1970 | Macovski et al. | 178/68 X |

*Primary Examiner*—Benedict V. Safourek
*Attorney, Agent, or Firm*—Cole & Jensen

[57] ABSTRACT

A wave shaper circuit reconstitutes the folded signal derived from the homodyne FM receiver discriminator. Alternate half-cycle gating of respective inverting and noninverting stages to which the discriminator output is fed produces succeeding half cycles of the detected signal in correct polarity relationship, and these are then combined in an adder which yields the reconstituted signal.

3 Claims, 3 Drawing Figures

INVENTOR.
STEPHEN F. WEISS
BY
Christensen, Sanborn & Matthews
ATTORNEYS

INVENTOR.
STEPHEN F. WEISS
BY
Christensen, Sanborn & Matthews
ATTORNEYS

HOMODYNE FM RECEIVER WITH FOLDED SIGNAL AND GATED UNFOLDING SIGNAL DETECTION

DESCRIPTION

This invention relates to an improved technique for FM signal reception and has for its broad object the elimination of tunable transformers or inductances typically employed in IF stages of conventional FM receivers. The invention is herein illustratively described by reference to its preferred embodiment as applied to FM signal reception; however, it will be recognized that certain modifications and changes therein with respect to details and other specific application of the certain features thereof may be made within the framework of the inventive concepts.

A specific object hereof is to devise an FM detection system capable of utilizing integrated circuit techniques throughout and thereby avoid the cost, bulk, and criticality of tunable IF strips.

A related object is to device a signal reconstituting or unfolding circuit which is simple and reliable in its operation and very inexpensive to construct using contemporary integrated circuit techniques.

A further object is to provide such a circuit having a substantially flat or uniform response characteristic as a function of frequency or frequency variations of the recovered signal. A related object is to fill this purpose without necessity for critical adjustments or balance typically required in conventional receiver applications in order to achieve satisfactory response characteristics.

In brief terms, the inventive concept hinges on utilizing the folded signal derived from a homodyne FM discriminator so as to produce scale-of-two gates of opposite relative polarity, and applying the respective gates, one to activate an inverting amplifier for the folded signal and the other to activate a non-inverting amplifier for the folded signal. The two amplifier outputs are then combined in an adder so as to produce the desired reconstituted signal. The term "amplifier" as herein used is intended to include amplifiers with positive, negative or unity gain as well as any equivalent transfer or gating circuits or devices capable of performing equivalent functions in the combination of the invention.

In the overall FM receiver system, the received frequency modulated carrier is mixed with a local oscillator reference signal frequency at carrier frequency and the resultant frequency modulation "audio" counterpart amplified and applied to a discriminator. Inasmuch as the frequency excursions both up and down from a midfrequency in the input of the discriminator produce corresponding responses (i.e., of the same polarity) in its output, the resultant detected signal is a folded version of the original audio signal that produced the frequency modulation counterpart. Therefore, alternate half cycles of the discriminator output are of inverted polarity and it is this folding or inversion that the wave-shaping circuit corrects in order to recover the original audio signal.

These and other features, objects and advantages of the invention will become more fully evident from the following description thereof with reference to the accompanying drawings.

Figure 1:
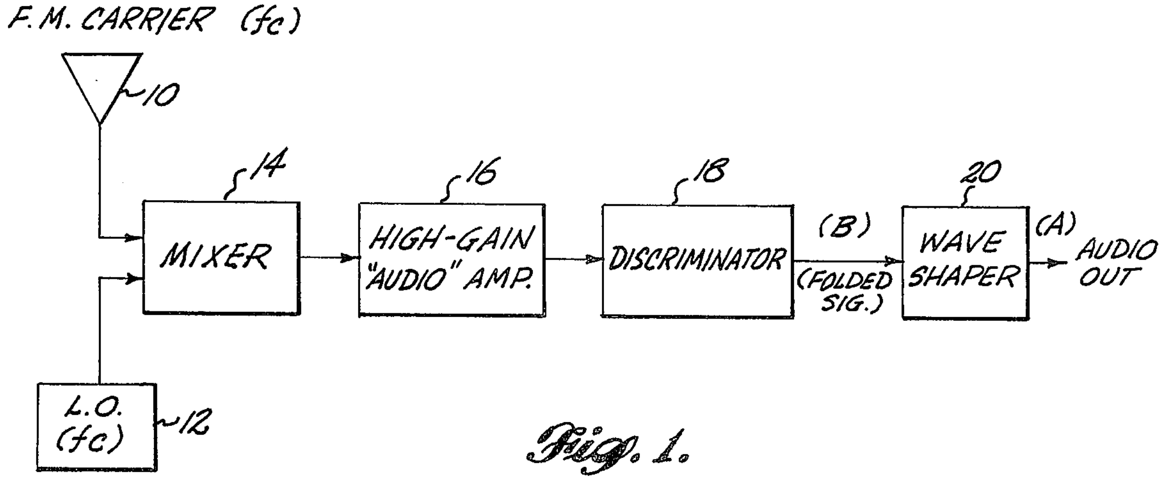
FIG. 1 is a block diagram of an FM receiver embodying the invention.
Figure 3:
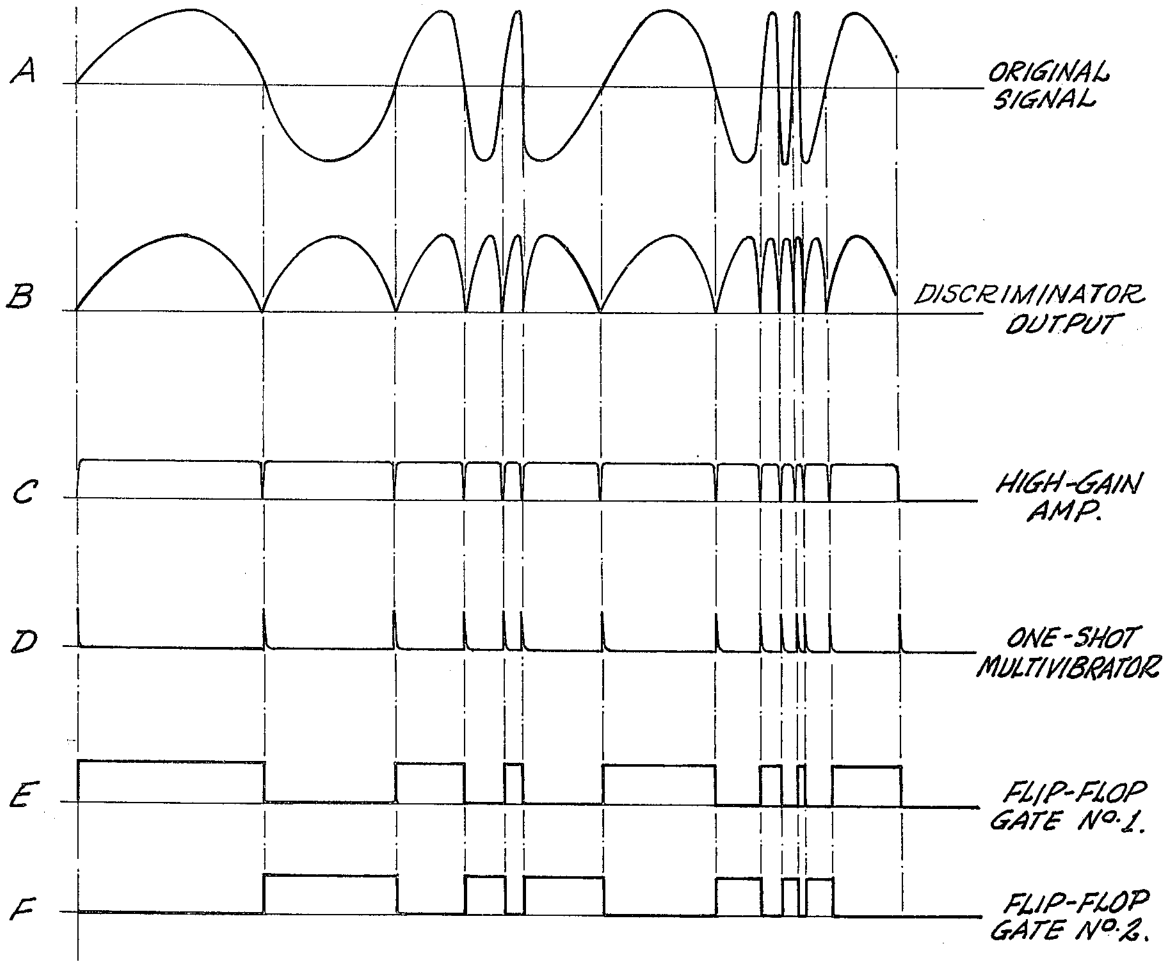
FIG. 3 is a wave diagram depicting operation of the system.

FM carrier at frequency $f_c$ is frequency modulated by conventional or suitable means (not shown) in accordance with an original signal (A—FIG. 3) and is introduced into the receiver system shown in FIG. 1 by way of antenna 10. In the receiver the frequency modulated carrier beats against a reference frequency $f_c$ equal to carrier frequency from a local oscillator 12 in mixer 14 so as to produce an "audio" frequency difference signal which is a frequency modulation coutnerpart of original signal A. This frequency modulation counterpart typically varies from zero frequency or DC to 50 Khz in military applications and from zero to 75 Khz in civilian applications, such as in commercial FM radio broadcasts. To convert this frequency modulation counterpart from amplifier 16 (which may include a conventional amplitude limiter and AGC circuit) into the original amplitude modulation or audio signal, it is passed through a discriminator 18 wherein both increases and decreases of frequency from a midpoint or reference are reflected in corresponding amplitude changes of the same polarity, as depicted in diagram B of FIG. 3. In this example, the discriminator is assumed to produce a positive output wave which is the audio signal recovered from the frequency modulation signal, but in which the negative half cycles are folded in polarity into the positive polarity region. It now becomes the task of the wave shaper circuit 20 to unfold or reconstitute the original audio signal A.

Figure 2:
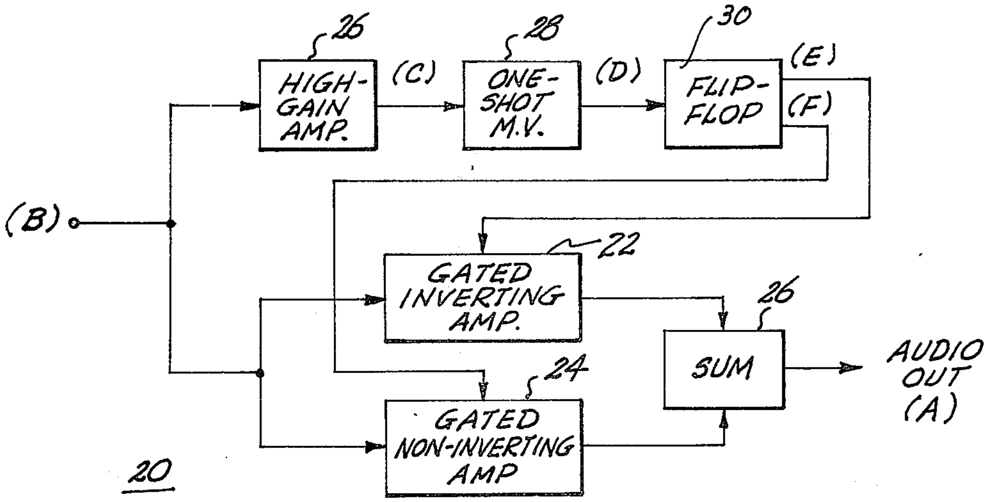
FIG. 2 is a block diagram of the wave shaper circuit which reconstitutes the audio signal from the discriminator of the receiver.

As shown in FIG. 2, wave shaper circuit 20 receives the folded signal B and applies it to three separate units, namely the gated inverting amplifier 22, the gated noninverting amplifier 24, and the high-gain squaring amplifier 26. In amplifier 26 the folded signal half cycles B are converted into amplitude-limited square waves having steeply rising leading edges as depicted in diagram C. The leading edges of these square waves in turn are utilized to trigger a one-shot multivibrator circuit 28 from which sharp trigger impulses D are derived. One such trigger impulse thus occurs at the inception of each half cycle of the folded signal B and is utilized to trigger the flip-flop or scale-of-two circuit 30.

Flip-flop circuit 30 serves as a gate generator. From one side of this circuit a gate wave or pulse (i.e., sometimes referred to as a "gate") E is derived for application to amplifier 22. From the opposite side of the flip-flop circuit a gate wave or pulse F is derived for application to amplifier 24. As will be seen, gate waves E and F are of opposite phase, that is the positive portions (the negative portions are not shown or are zero) of each such wave occur during the negative or zero portions of the other such wave and it is the positive portions which in the illustrated case activate or sensitize the respective amplifiers 22 and 24 so as to enable such amplifiers to function as such while remaining nonfunctional or serving as barriers to passage of input signal during the intervening portions. However, inasmuch as the gating waves E and F are phase related to the half cycles of the folded signal B, and since amplifier 22 inverts when it amplifiers, the resultant outputs from these amplifiers added together in the summing circuit 26 produce the desired reconstituted full-wave audio signal A as shown. As will be appreciated such audio signal may be of any frequency, form or combination of frequencies and forms, such as speed signals or signals of frequencies above the audible range as such. The term "audio" is thereby intended as a broad term to distinguish from the applications wherein a carrier is employed.

In summary, therefore, the invention provides a novel FM receiver having the advantages described and an inherently broad band (i.e. frequency accommodating) discriminating and signal-reconstituting circuit wherein polarity folding of the signal in the discriminator is synchronously corrected in reconstituting the original audio signal in the output of the system.

What is claimed is:

1. An FM receiver comprising means to convert a receiver FM carrier into a folded audio signal wherein alternate half cycles are of reversed polarity, and a wave shaper circuit means operable in response to said folded audio signal to reconstitute said audio signal including first means reversing the polarity of alternate half cycles thereof and including second means mixing the unreversed half cycles with the reversed half cycles of such folded audio signal.

2. An FM receiver as defined in claim 1, wherein said first means of the wave shaper circuit means comprises inverting and non-inverting amplifier means having respective signal inputs both receiving said folded audio signal, and each additionally having a gating input, means responsive to the folded signal and operable thereby for deriving two recurring gating signals from alternate half cycles of the signal and applying said gating signals to the gating inputs of said inverting and non-inverting amplifiers, each of said gating signals being operable on alternate half cycles of the signal to condition the associated amplifier selectively to pass alternate half cycles of said audio signal, and wherein said second means includes means summing the outputs from said amplifiers.

3. The FM receiver defined in claim 2, wherein the means for deriving said gating signals comprises high-gain amplifier means responsive to the folded audio signal, trigger means responsive to the inceptions of the half cycles of the amplified folded audio signal from said high-gain amplifier means to produce trigger pulses therefrom, and flip-flop circuit means triggered into its alternate states by the successive trigger pulses to produce the gating signals.

* * * * *